United States Patent
Schrage

(10) Patent No.: US 11,803,578 B2
(45) Date of Patent: Oct. 31, 2023

(54) PERSONALIZED EVOLVING SEARCH ASSISTANCE

(71) Applicant: SAP SE, Walldorf (DE)

(72) Inventor: Jan Schrage, Helmstadt-Bargen (DE)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 17/480,896

(22) Filed: Sep. 21, 2021

(65) Prior Publication Data
US 2023/0093019 A1    Mar. 23, 2023

(51) Int. Cl.
| | |
|---|---|
| G06F 7/00 | (2006.01) |
| G06F 16/332 | (2019.01) |
| G06N 20/00 | (2019.01) |
| G06F 16/35 | (2019.01) |
| G06F 16/33 | (2019.01) |

(52) U.S. Cl.
CPC ...... *G06F 16/3326* (2019.01); *G06F 16/3334* (2019.01); *G06F 16/35* (2019.01); *G06N 20/00* (2019.01)

(58) Field of Classification Search
CPC .. G06F 16/3326; G06F 16/3334; G06F 16/35; G06F 16/93; G06F 16/313; G06F 16/24578; G06F 16/3347; G06F 17/16; G06F 30/27; G06F 2212/454; G06N 20/00
See application file for complete search history.

(56) References Cited

U.S. PATENT DOCUMENTS

| | | | | |
|---|---|---|---|---|
| 11,144,718 | B2 * | 10/2021 | Park | G06F 40/20 |
| 11,282,509 | B1 * | 3/2022 | Li | G06F 16/65 |
| 2013/0246412 | A1 * | 9/2013 | Shokouhi | G06F 16/9535 |
| | | | | 707/E17.084 |
| 2014/0250115 | A1 * | 9/2014 | Yang | G06F 16/58 |
| | | | | 707/728 |

OTHER PUBLICATIONS

Davies, "How Machine Learning In Search Works: Everything You Need to Know", Search Engine Journal, dated May 26, 2020, 17 pages.

\* cited by examiner

*Primary Examiner* — Mohammad A Sana
(74) *Attorney, Agent, or Firm* — Fountainhead Law Group P.C.

(57) ABSTRACT

Search assistance personalized to a user, may be afforded by combining the application of scoring functions, with the training a Machine Learning (ML) model based upon feedback from that user. A plurality of scoring functions are applied to query results to calculate a plurality of score vectors. The ML model is then applied to generate a ranked list of vectors. Feedback from the user, is incorporated to develop an evolving memory. The feedback may be explicit, or may be implicit—e.g., based upon user selection of particular score vector(s) from the list or based upon user selection of particular query results corresponding to the score vectors. Embodiments may enhance relevance of search assistance by removing past feedback from the evolving memory that is used to retrain the ML model. Embodiments can provide assistance to search text corpuses utilizing scoring functions considering frequency of occurrence of particular words or terms.

20 Claims, 9 Drawing Sheets

FIG. 6

| Query/Score | Doc 1 | Doc 2 | Doc 3 | Doc 4 |
|---|---|---|---|---|
| Payslip | 13 | 7 | 0 | 6 |
| Insurance | 4 | 0 | 12 | 7 |

FIG. 5

| Document | Words in Summary | Words in Description | Referenced |
|---|---|---|---|
| 1 | payslip | Payslip 5x, Insurance 1x | 3x |
| 2 | payslip | Payslip 2x | — |
| 3 | Insurance | Insurance 5x | 2x |
| 4 | Insurance, payslip | Payslip 1x, Insurance 2, | — |

PERSONALIZED EVOLVING SEARCH ASSISTANCE

BACKGROUND

Unless otherwise indicated herein, the approaches described in this section are not prior art to the claims in this application and are not admitted to be prior art by inclusion in this section.

Modern software programs can be highly complex, with many features that can prove daunting even to experienced users. While some User Assistance (UA) applications exist, these tend to focus upon topics that are applicable to all users generally.

In particular, UA applications may focus upon understanding the semantics of information and the identification of topics. Assistance may not focus upon a specific user, or evolve in a useful manner over time.

SUMMARY

Search assistance personalized to a user, may be afforded by combining the application of scoring functions, with the training a Machine Learning (ML) model based upon feedback from that user. A plurality of scoring functions are applied to query results to calculate a plurality of score vectors. The ML model is then applied to generate a ranked list of vectors that is offered to the user. Feedback from the user is incorporated to develop an evolving memory that serves to retrain the ML model. The feedback may be explicit, or may be implicit—e.g., based upon user selection of particular score vector(s) from the list. Embodiments may enhance relevance of search assistance by removing past feedback from the evolving memory. Embodiments may be especially suited to rapidly providing assistance to search text corpuses utilizing scoring functions that consider frequency of occurrence of particular words or terms.

The following detailed description and accompanying drawings provide a better understanding of the nature and advantages of various embodiments.

BRIEF DESCRIPTION OF THE DRAWINGS

FIG. 5 shows results of text searching a document corpus in an example.

FIG. 6 shows results of scoring according to the example.

DETAILED DESCRIPTION

Described herein are methods and apparatuses that implement search assistance to a user. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
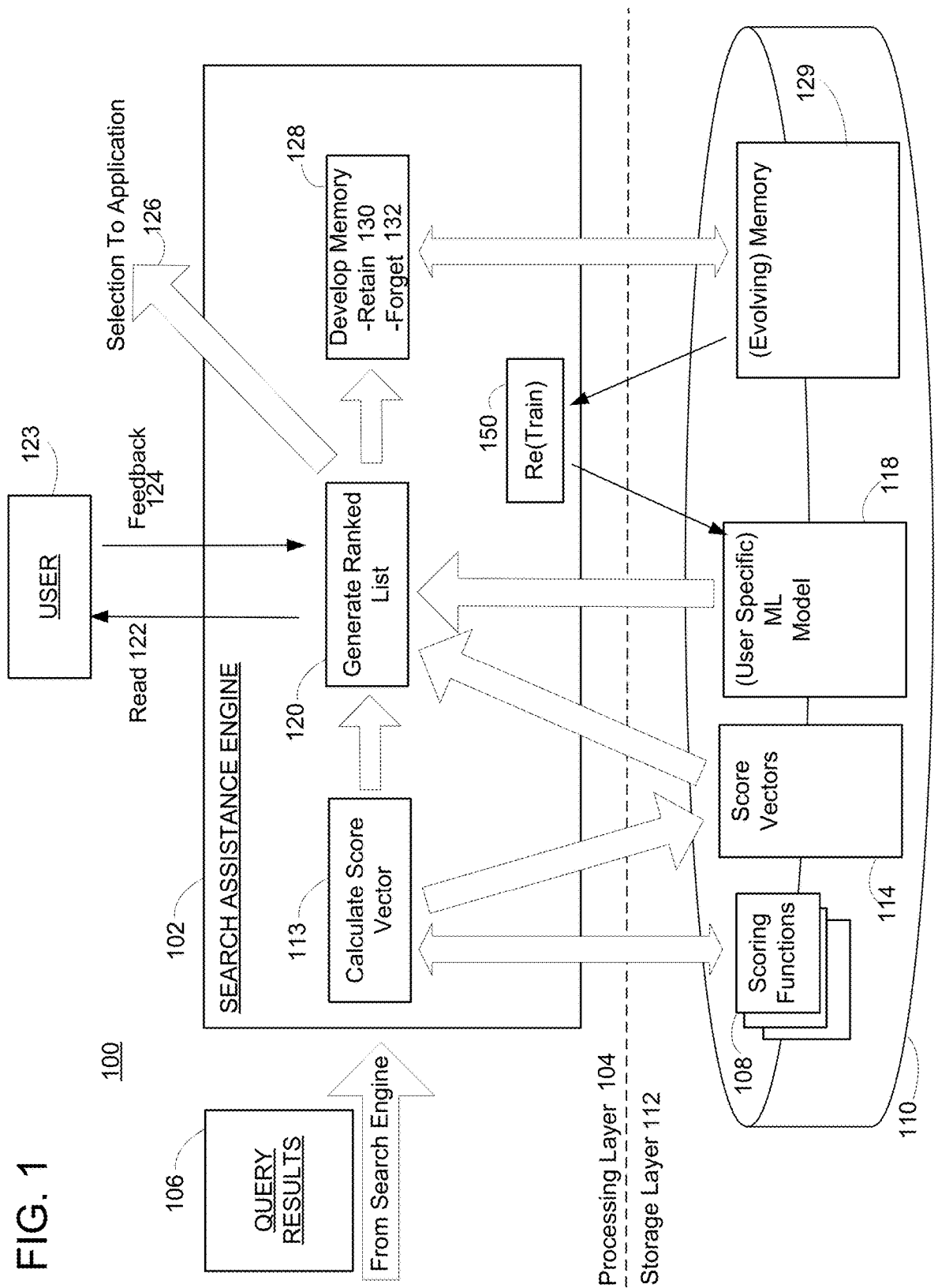
FIG. 1 shows a simplified diagram of a system according to an embodiment.

FIG. 1 shows a simplified view of an example system that is configured to implement personalized search assistance according to an embodiment. Specifically, system 100 comprises a search assistance engine 102 that is located in a processing layer 104.

The search assistance engine is configured to receive query results 106 as an input. The query results may be received from a separate search engine.

In response to receiving the query results, the search assistance engine is configured to reference a plurality of scoring functions 108. These scoring functions are stored within a database 110 that is located within storage layer 112. As described in detail below, according to some embodiments, where the search result comprises a text corpus, scoring functions may consider frequency of occurrence of specific words or phrases.

Based upon application of the scoring functions to the query results, the search assistance engine is configured to calculate 113 a plurality of score vectors 114 and store those score vectors in a list.

Next, the search assistance engine is configured to apply a ML model 118 to the vectors, in order to produce a ranked list 120. As described herein, the ML model is specialized to a particular user, rather than to a group of users or even a larger population.

The search assistance engine then offers or displays the ranked list for reading 122 by a user 123, where the ranked list may be either the ranked list of score vectors 114 or the list of the corresponding query results that is ranked in the order of the associated respective score vectors. Based upon user's evaluation, the user provides feedback 124 regarding the ranked list. Details regarding the feedback are received by the search assistance engine.

According to some embodiments, the feedback may comprise explicit feedback on the ranked list of score vectors that is being offered in the form of an explicit selection from the ranked list of score vectors. According to other embodiments, the feedback may comprise implicit feedback in the form of subsequent behavior by the user in response to reviewing and interacting with the ranked list of query results. From these interactions, the search assistance engine derives an implicit user selection of the corresponding score vectors.

Based upon the user's selection, the search assistance engine may take several actions. One action is to forward 126 the user's selection on to the relevant application for further processing.

Another action taken by the search assistance engine is to leverage the user's selection to develop 128 a memory 129 that retains 130 the specific behavior of the user. This memory also evolves to forget 132 certain past actions by the user (e.g., based upon an elapsed time since occurrence of that past action). In this manner, the memory serves to enhance the importance of a user's most recent selections, over selections that have occurred in the more distant past.

The engine then functions to retrain 150 the ML model based upon the updated evolving memory. Thus, when the next search result is received, the personalized search assistance is tailored to the most recent actions of the user.

Figure 2:
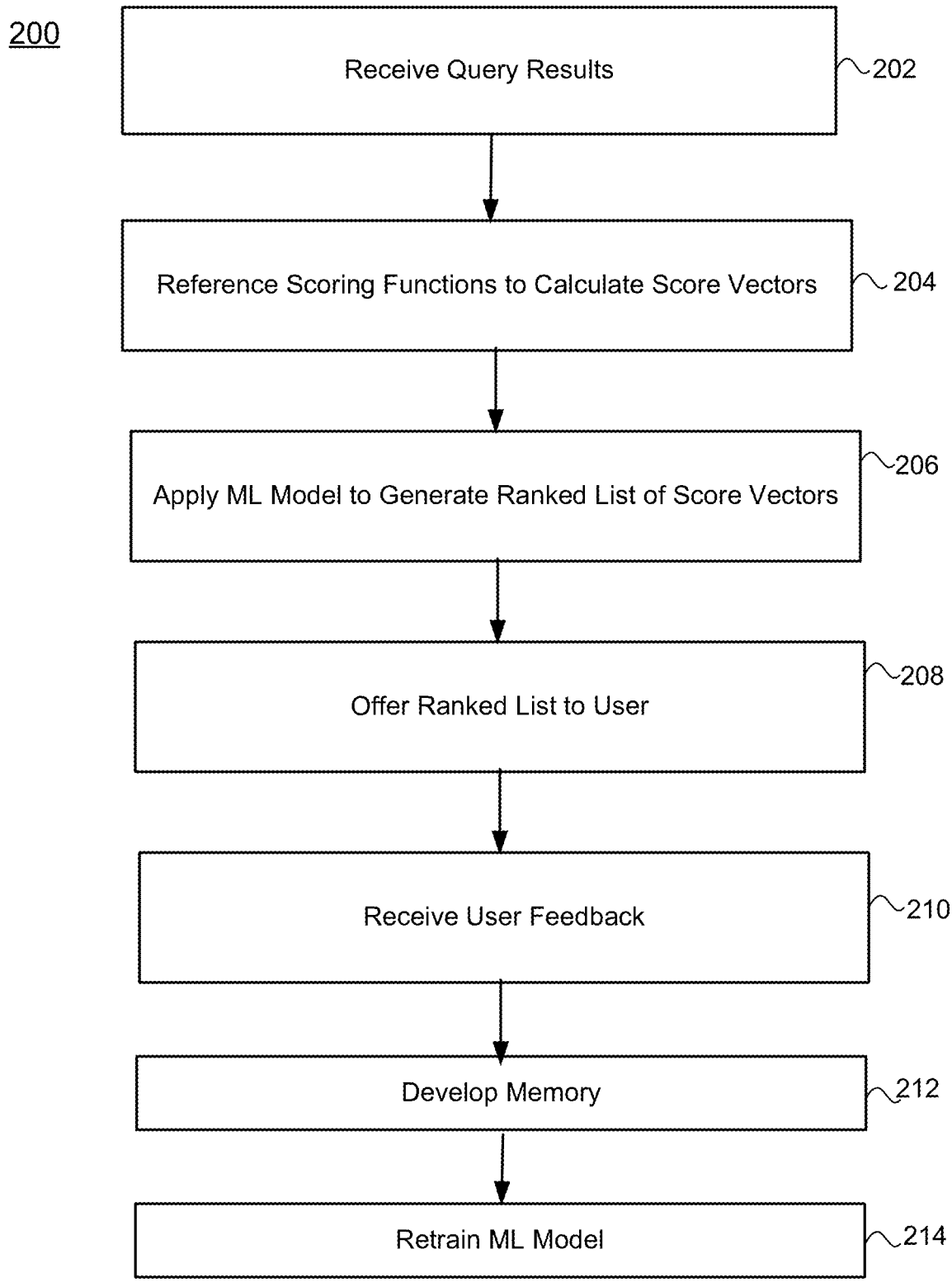
FIG. 2 shows a simplified flow diagram of a method according to an embodiment.

FIG. 2 is a flow diagram of a method 200 according to an embodiment. At 202, query results are received.

At 204, scoring functions are referenced to calculate score vectors. At 206, a machine learning model is applied to generate a ranked list of score vectors. The query results corresponding to the score vectors are ordered in an accordingly ranked list of query results.

At 208, at least one the ranked lists is offered to a user for feedback. At 210, the user's feedback is received.

At 212, the evolving memory is developed to record data regarding the feedback. Aged data may also be removed from the evolving memory.

At 214, the ML model is retrained according to the evolving memory.

Systems and methods according to various embodiments, may offer one or more benefits. One possible benefit is that the search assistance that is being provided, is specific to the particular user. Thus, the assistance is personalized in nature, rather than considering possibly extraneous information of a larger group that is not particularly relevant to the specific user.

Another possible benefit is that the evolving memory is configured to deliberately delete older information. Thus, the ML model is continuously being updated to reflect the most recent activity of the user, rather than affording long-ago actions equal weight in providing search assistance.

Further details regarding personalized evolving software user assistance according to various embodiments, are now provided in connection with the following example.

EXAMPLE

This example relates to the implementation of personalized, evolving search in the context of furnishing relevant User Assistance (UA) information for software. As described above, embodiments can incorporate both text and meta-data in performing searching at the request of a particular user. Evaluation may take place through a scoring process that is the basis for subsequent machine learning.

Consider a project that involves reviewing documentation that may be applicable to providing support for a software package. Embodiments recognize that individual users have different interests when conducting searches. As such, embodiments may train machine learning models tailored for each individual user.

In this example, a software support agent user might be tasked with looking for the latest changes, and be interested in newer documents. By contrast, a documentation developer might be more interested in finding the most referenced documents, which are likely to contain definitions and explanations.

The user-specific nature of embodiments, can learn to adapt and deliver the most relevant documents for each user. Thus, if the support agent later assumes a role tending to look for more previously referenced documents, embodiments will learn that aspect and adapt to the user's new criteria.

Figure 3:
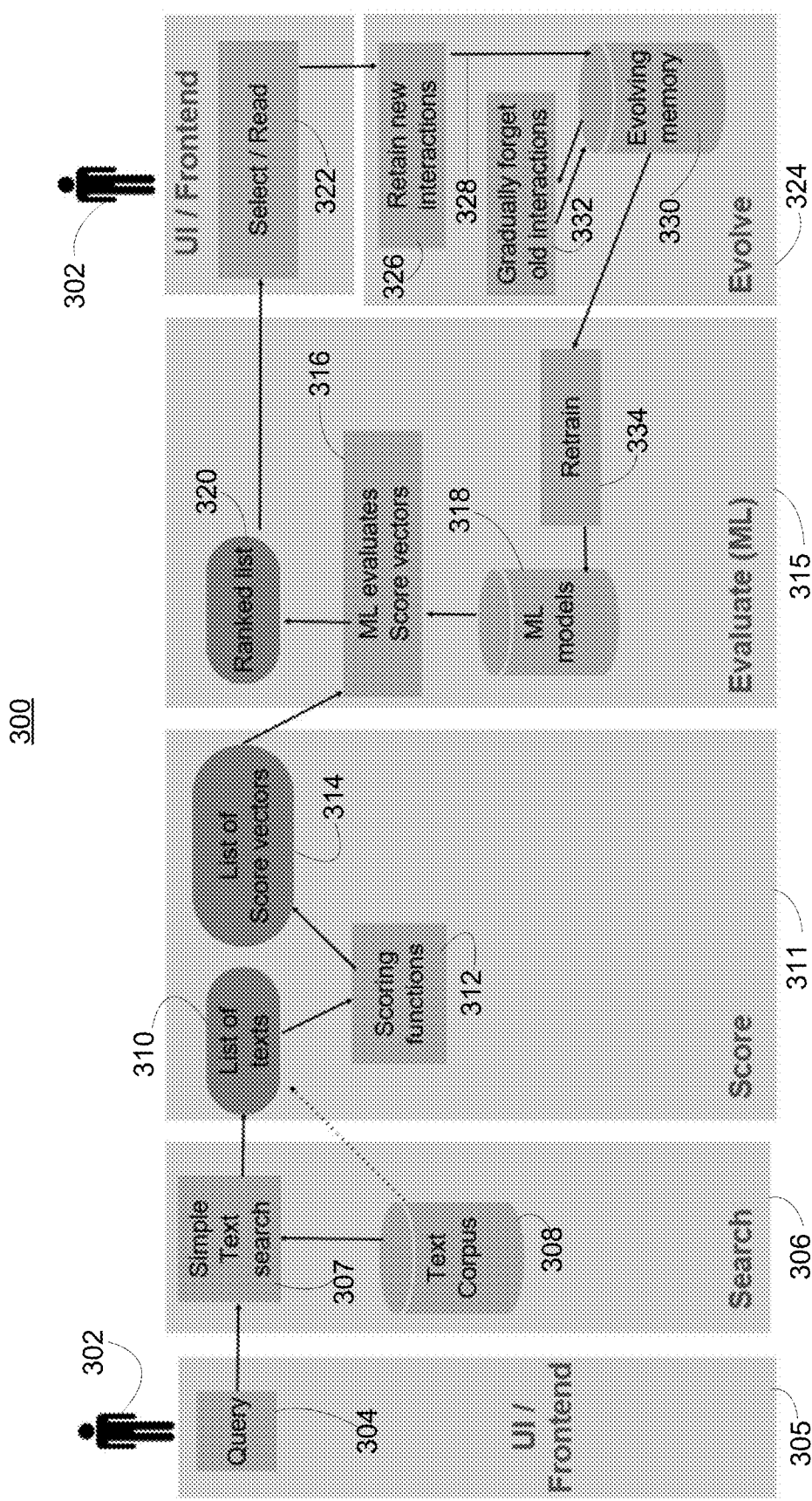
FIG. 3 is a simplified block diagram illustrating search assistance implemented according to one embodiment.

FIG. 3 shows a simplified diagram illustrating the flow of activity according to an exemplary embodiment. As shown in the simplified flow 300 in FIG. 3, the user 302 enters a query 304 to a frontend 305. In particular, the software user who is seeking assistance, conducts text research by searching for words and phrases.

During a search phase 306, a simple text search 307 is performed upon a text corpus 308. That text corpus can comprise, e.g., recent text documents (e.g., security alerts, updates) as well as previously-referenced documents (e.g., manuals) that may be relevant to provide accurate UA of a particular software package. The search returns a list of texts 310.

Then, as part of a scoring phase 311, one or more scoring functions 312 are applied to the list of texts. Embodiments generate a score vector for each text based on text and meta-information. The result is a list 314 of score vectors.

It is noted that embodiments do not seek to understand the meaning of a particular query. Rather, embodiments operate using text scoring and meta-scoring functions (such as back-references).

A ML procedure is then trained that evaluates the score vector to learn to identify the most relevant results for this user. According to embodiments, a target of the machine learning models is the structured corpus of text having identifiable metadata that may arise from a project of limited scope.

Available metadata can be of many types, including but not limited to:
geography such as country, GPS, others
identifiers,
backlinks,
references, etc.

Next, during an evaluation phase 315, the score vector is processed according to a ML procedure 316. That ML procedure is based upon a model 318 that has been trained with training data pertaining to the particular user.

Embodiments may utilize an automated training model that relies upon behavior observed from a particular user. Explicit feedback or manual training may not be required.

Embodiments do not rely upon large corpuses of training data. Rather, by learning from each individual user and by focusing upon a specific domain, learning may be achieved with small volumes (e.g., in the single and double digits) of training data.

The result of application of machine learning, is a ranked list 320. The user then reads and selects 322 the most useful results to him or her. According to some embodiments, this can be an implicit selection through observation of user behavior.

Next, in an evolution phase 324 the interactions of the particular user to select positives and negatives, is retained 326 and fed back 328 into the training data stored in the evolving memory 330. As described herein, the evolving nature of the memory may involve gradually forgetting 332 (removing) data based upon time and/or memory considerations.

Specifically, in order to allow the system to continue adapting to the user, embodiments implement a mechanism for gradual forgetting over time. This mechanism allows for a gradual evolution of the system and ongoing adaptation to changing user needs.

The ML procedure is retrained 334 using the most up-to-date data and metadata involving the particular user. In effect, the machine learning procedure learns from the user how to evaluate the score vector to give the results that particular user is looking for. The ML model parameters are stored for this user—each user has her or his own trained model.

Details regarding scoring are now discussed. Information is transformed into a score through suitable scoring function(s). This allows for different information types (e.g., text occurrences, text length, text age, references, and others) to be used in a single machine learning model in a consistent manner.

Such scoring allows evaluating a text against a number of criteria. This evaluation is then able to be presented to the ML procedure in a unified form as a score vector.

Instead of trying to understand a meaning of a query and/or impose a category, embodiments calculate a vector of scores against available text in the corpus that matches the search criteria.

To illustrate this concept, a set of scoring functions is presented, and then an example is worked through. In particular, this example assumes that each member of the corpus has at least the following:
1) a summary
2) a description
3) some metadata Scoring functions may depend on the available metadata. For example, where references or backlinks form part of the metadata, a citation score can be calculated.

Figure 4:
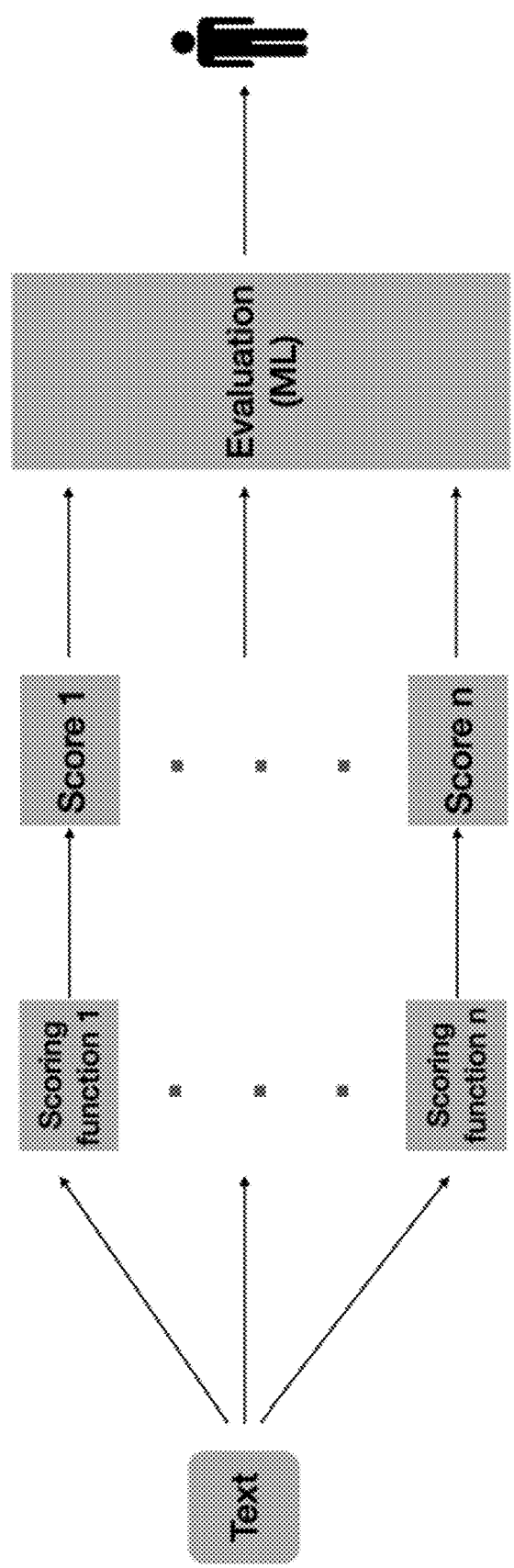
FIG. 4 illustrates a simplified schema for scoring a single text.

The schema for scoring a single text is illustrated in FIG. 4. This is done for each potentially relevant text for a query. This could be texts that include the search terms.

Various examples of possible specific scoring functions are now described.

Scoring Function: Summary Contains Query
This scoring function checks if the summary contains the terms or phrase searched for. The assumption is that if the phrase is contained in the summary, the document is likely to be more relevant. If yes, it returns a score of 5. If not, 0.

Scoring Function: Phrase Count in Text
This scoring function counts the occurrences of the query phrase in the text. It does not take the length of the text into account. An assumption is that a phrase mentioned frequently is more important. This scoring function gives 1 point per occurrence.

Scoring Function: Phrase Frequency Count in Text
This scoring function counts the frequency of the query phrase in the text. The assumption is that a phrase mentioned more often relative to the text size might be more important. This scoring function gives 5 point per occurrence per 100 words.

Scoring Function: Text Length
This scoring function counts the words in the text. An assumption is that longer texts may be more relevant or contain more information. This function awards 1 point per 100 words.

Scoring Function: Referenced Count
This function counts the number of references to the current text. It awards 1 point per reference.

Scoring Function: Relevant Referenced Count
This function counts the number of references to the current text from texts that also contain the search phrase. It awards 1 point per reference.

Scoring Function: Outgoing References
This function counts the number of references to other texts. It awards 1 point per reference.

Scoring Function: Relevant Outgoing References
This function counts the number of references to other texts that also contain the search phrase. This scoring function awards 1 point per reference.

Scoring Function: Text Age
This scoring function counts the age of the text. This could be months, possibly scaled by a factor for very long-lived projects. This function awards 1 point per month of age.

It is emphasized that the above specific scoring functions are ones found to be useful, but are intended merely as examples and are not limiting.

FIG. 5 summarizes the initial results of text searching returning four documents (1-4) according to an example.

FIG. 6 shows examples of numerical values of return scores for the documents 1-4. Those scores may be adjusted.

The aim here is twofold.
1) The default scoring before learning should reflect something that makes sense, since then our only option is to rank by score. After learning, it will be up to the ML procedure to adjust its own weights.
2) The scores should be of roughly the same order of magnitude. This allows most machine learning procedures to work better.

The scoring functions can be extended to any type of information available in the project. The scoring functions may be simple, but allow embodiments to have scoring functions that make some sense in terms of a text search, and allow for a machine evaluation.

When an individual user first uses the system, the machine is untrained. The result will be determined only by the scores.

This may be one consideration in setting up the set scoring functions—the results should make some kind of sense. From that start, the machine learning procedure machine will learn quickly.

For the scoring results in FIG. 6, the following three scoring functions are used:
  summary contains query
  phrase count in text
  referenced count Here, the Document number 1 contains the word "payslip" (once in the summary and 5× in the description). Also, the word "insurance" appears once in the description.

For the query "payslip", the resulting score is 5+1×5+3=13. The score vector is [5,5,3].

For the query "insurance", the resulting score is 0+1+3=4. The score vector is [0,1,3].

Note that only the Documents 1 and 3 are referenced in FIG. 6. A user looking for definitions is likely to look for those documents first, in the respective queries. The machine learning procedure can recognize that user behavior.

The creation and evolution of ML models to which the scores are fed as input, are now discussed. Embodiments have the ML procedure match a numerical scoring vector to an output value (here, binary). This is a typical classification problem, but utilizing a small and evolving training set based on user interaction.

A classifier such as multi-layered perceptrons, can be used under these circumstances.

However, higher quality initial results may be achieved using a decision tree type classifier. This classifier produced accurate and useful results quickly. Specifically, after training the evaluation of new queries produced desired results—i.e. the classifier had learned correctly.

Training may be through explicit or implicit feedback from the user. That is, having produced a result, feedback from the user is consumed. This feedback may be obtained explicitly (e.g., by asking the user) or implicitly (e.g., by monitoring subsequent user interactions).

Training using explicit feedback is now described in detail. For explicit training, after each search the user confirms explicitly which results are useful. Then, the entire set is passed back for training, with the useful results marked.

Such an approach may offer certain drawbacks. That is, a user might now know which results are useful without actually reading the documents. This would lead to flawed training data.

Training using explicit feedback also requires an additional interaction from the user. Typically, people who run a document search want to read a document next, rather than train a machine assistant.

Training using implicit feedback is now described. For such implicit training, the follow-up user behavior is monitored, e.g. which documents from the query results are read, downloaded, or otherwise interacted with. Those documents are then marked as useful and passed to the backend.

For implicit training, each query result has a score vector attached. Accordingly, through monitoring user behavior, the user also selects score vectors without being exposed to the machine learning model. Training happens in a transparent manner while the user goes about their regular activities.

Training happens again on the full result set. It is possible to impose additional requirements, such as "spends at least 1 minute reading". This ensures that a document merely glanced at is not deemed useful.

Since implicit training approaches derive training data directly from observed user behavior, there is no additional burden on the user. The machine is trained in the background.

Figure 7:
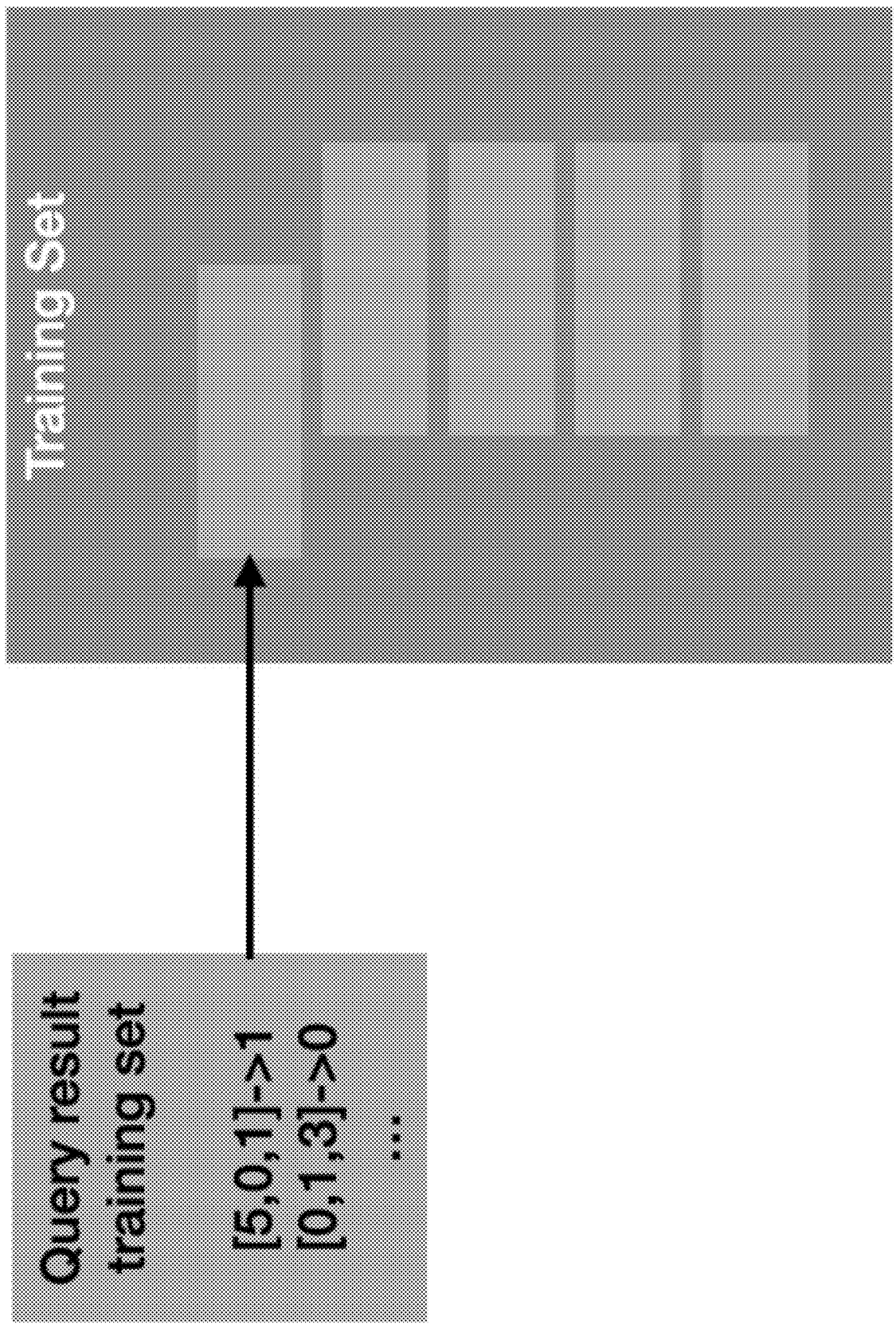
FIG. 7 shows a simplified view of a machine learning model implementing an iterative approach.

The training set and iterative training is now discussed. Each query and the resulting observation results in an amount of training data. Training may therefore be iterative. This is shown in FIG. 7.

An overall training set belonging to a user is maintained. Each new set is added to it. In case one of the new vectors is identical to an older one, the older one is overwritten.

Evolution of the ML model, and in particular the value of forgetting, is now discussed. Normally, the aim of training a machine learning model is the highest possible accuracy, which is achieved through large amounts of training data.

By contrast, embodiments seek reasonable accuracy while allowing user preferences and behavior to change. In other words, machine learning according to embodiments evolves gradually with the user.

For example, a user who was only looking for the newest documents in a project might transition to a new role calling for finding definitions and foundational documentation. If training data is merely accumulated without ever being deleted, the ML procedure might never fully emerge from the initially learned "new is important" behavior (or it might take a long time).

Accordingly, in order to evolve in a useful manner, embodiments may include the capacity for forgetting (removing) training data.

Specific models for performing such a forgetting function may consider time and/or memory limits. In a time-limited model, training data is stored with a time stamp, and after a certain time, deleted. This ensures that, if the user preferences evolve over time, the machine can evolve relatively quickly as well without being hampered by earlier training.

In a memory-limited model, the size of the full training set is limited, and once reached, the earliest data is pushed out. Again, data is stored time-stamped. This too ensures the possibility to evolve the training set to keep pace with changing user preferences.

In both cases, if the user preferences remain the same, when a limit is reached and new data comes in, the machine will simply be trained with more data that reflects the same type of preference.

A motivation to combine both time and memory limit models, is that the memory-limited model would be more useful for heavy users. By contrast, a time limited model may be more useful for light users who might never reach the memory limit.

Figure 8:
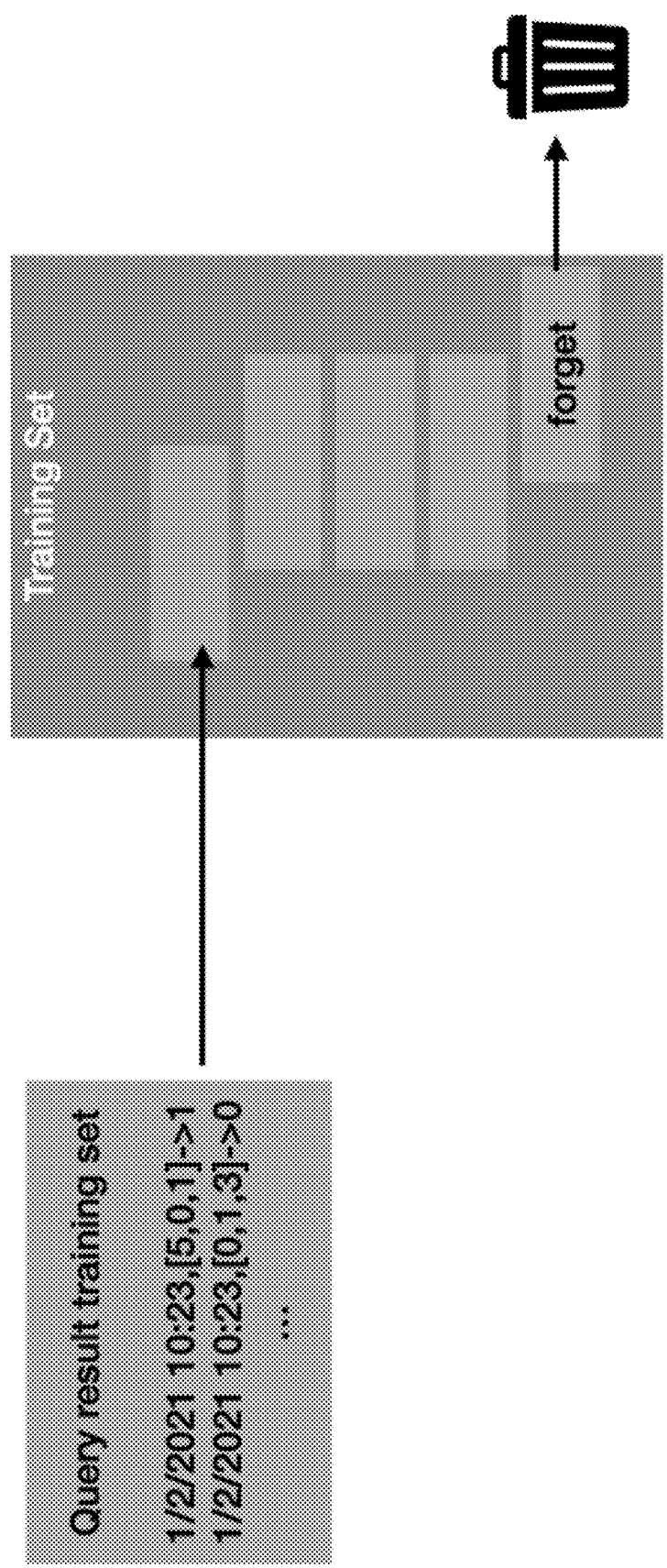
FIG. 8 shows a simplified view of a machine learning model implementing a forgetting function.

For both approaches, the timestamp of a new score vector is stored together with the vector. FIG. 8 illustrates the model.

As in the previous example, the vector comprises three scoring functions. But now there are 1000 documents (not merely 4) in the repository.

The memory limit is set to 300 vectors. The time limit is set to 1 month.

User A works a lot with the tool and reaches 300 scoring vectors after 3 days. Her next query adds another 10 vectors.

The 10 oldest are dropped from the set, and the new ones added. The machine is retrained. If the User A starts to look for different things, the machine can adapt at her pace.

By contrast, User B works less with the tool and reaches a month without reaching the memory limit. Every day, data that is older than 30 days is dropped from the set. Even with less use, this ensures that new training data gets a comparatively higher weight and the machine is able to adapt.

Inclusion of the forgetting function not only allows for better, gradual evolution of the ML procedure, it also addresses potential performance problems. Specifically, the forgetting does not allow the training sets to grow indefinitely.

Returning now to FIG. 1, there the particular embodiment is depicted with the engine responsible for search assistance as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 9:
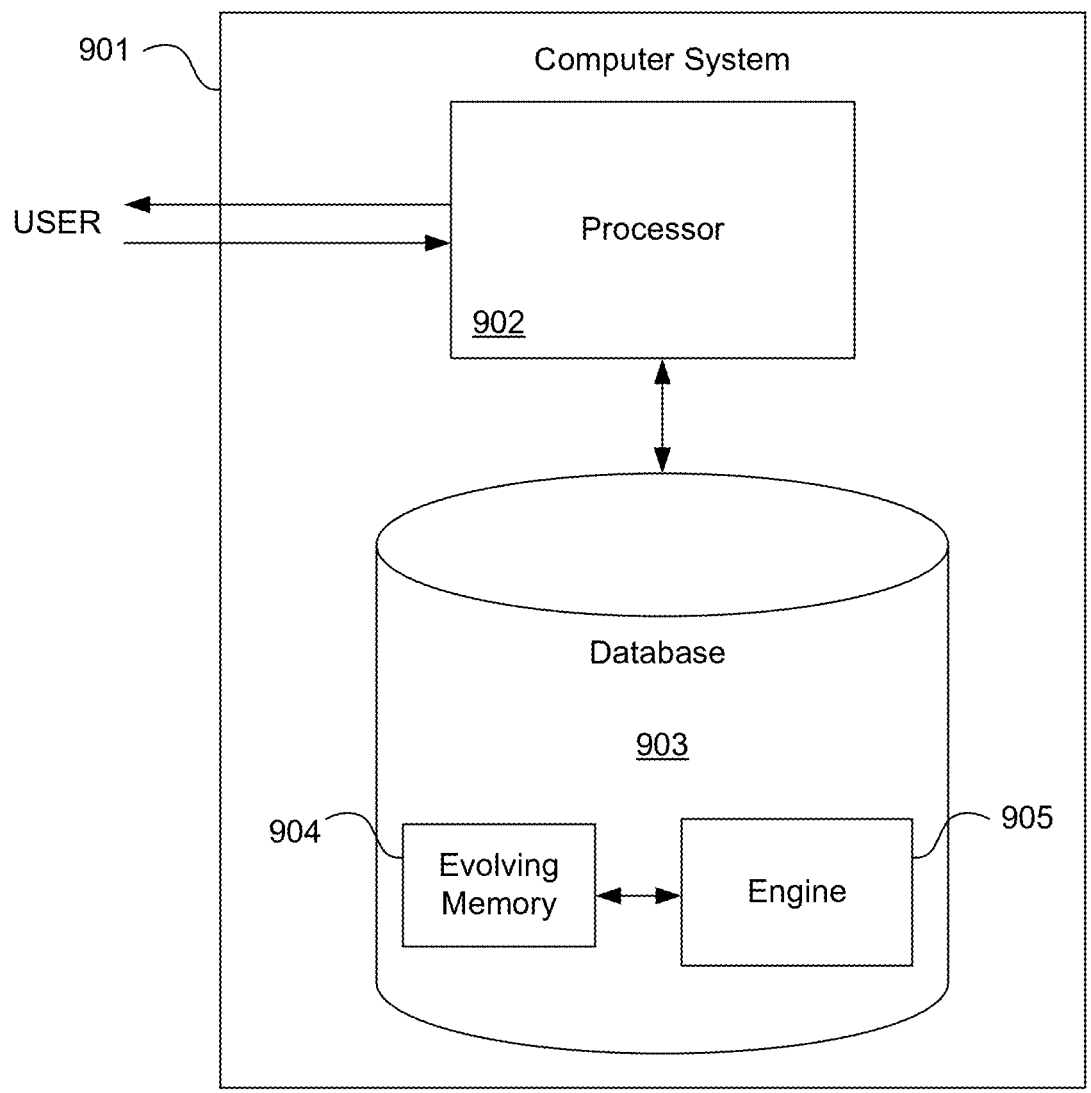
FIG. 9 illustrates hardware of a special purpose computing machine configured to implement personalized search assistance according to an embodiment.

Thus FIG. 9 illustrates hardware of a special purpose computing machine configured to implement search assistance according to an embodiment. In particular, computer system 901 comprises a processor 902 that is in electronic communication with a non-transitory computer-readable storage medium comprising a database 903. This computer-readable storage medium has stored thereon code 905 corresponding to an engine.

Code 904 corresponds to an evolving memory. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
receiving query results;
referencing the query results and a plurality of scoring functions to calculate a plurality of score vectors;
applying a model to the plurality of score vectors to generate a ranked list of score vectors;

receiving feedback on the ranked list by the user;
adding the feedback to develop an evolving memory; and
training the model with the evolving memory.

Example 2. The computer implemented system and method of Example 1 further comprising removing past feedback by the user from the evolving memory.

Example 3. The computer implemented system and method of Examples 1 or 2 wherein:
the evolving memory comprises an in-memory database; and
the training is performed by an in-memory database engine of the in-memory database Example 4. The computer implemented system and method of Examples 1, 2, or 3 wherein the feedback comprises explicit feedback.

Example 5. The computer implemented system and method of Examples 1, 2, or 3 wherein the feedback comprises implicit feedback.

Example 6. The computer implemented system and method of Examples 1, 2, 3, 4 or 5 wherein the training uses a decision tree type classifier.

Example 7. The computer implemented system and method of Examples 1, 2, 3, 4 or 5 wherein the training uses a multi-layer perceptron.

Example 8. The computer implemented system and method of Examples 1, 2, 3, 4, 5, 6, or 7 wherein the query results each comprise a text corpus including a summary, a description, and metadata.

Example 9. The computer implemented system and method of Example 8 wherein at least one of the scoring functions considers a frequency of appearance of a word in the text corpus.

Figure 10:
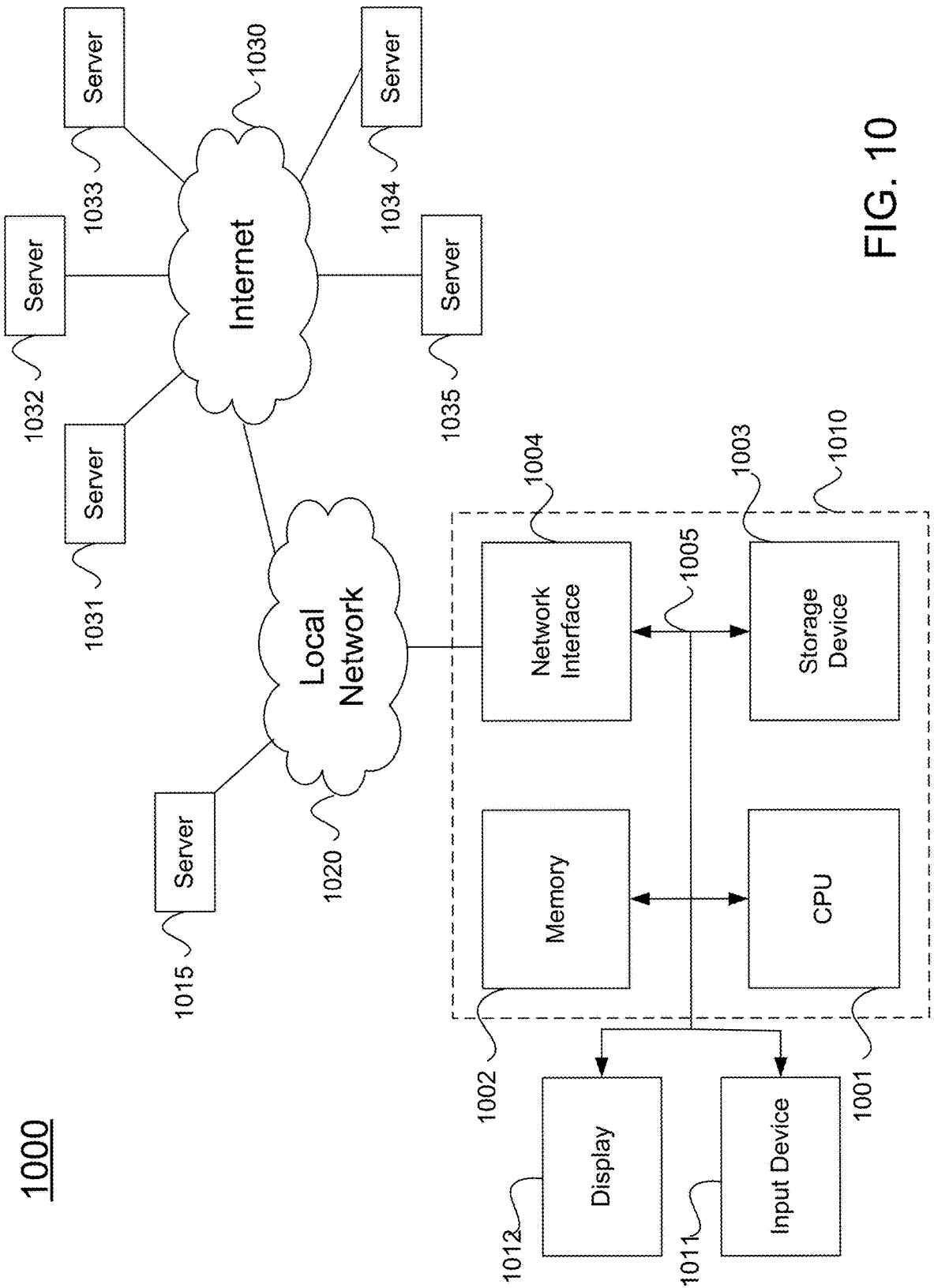
FIG. 10 illustrates an example computer system.

An example computer system 1000 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable media.

Computer system 1010 may be coupled via bus 1005 to a display 1012, such as a Light Emitting Diode (LED) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 804 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    entering a query by a user;
    receiving a query result;
    referencing the query result and a plurality of scoring functions to calculate a plurality of score vectors;
    applying a model to the plurality of score vectors to generate a ranked list of score vectors;
    receiving feedback on the ranked list by the user;
    adding the feedback to develop an evolving memory, wherein the evolving memory comprises a set of training data, wherein the set of training data has a limited size;
    training the model with the evolving memory;
    updating the evolving memory by removing past feedback by the user from the evolving memory based on the received feedback and reaching the limited size of the set of training data; and
    retraining the model based on the updated evolving memory.

2. A method as in claim 1 wherein the query result comprises a text corpus including a summary, a description, and metadata.

3. A method as in claim 2 wherein at least one of the scoring functions considers a frequency of appearance of a word in the text corpus.

4. A method as in claim 1 wherein the feedback comprises explicit feedback.

5. A method as in claim 1 wherein the feedback comprises implicit feedback.

6. A method as in claim 1 wherein the training uses a decision tree type classifier.

7. A method as in claim 1 wherein the training uses a multi-layer perceptron.

8. A method as in claim 1 wherein:
the evolving memory comprises an in-memory database; and
the training is performed by an in-memory database engine of the in-memory database.

9. A method as in claim 1 wherein referencing the plurality of scoring functions is based on the query result.

10. A method as in claim 1 wherein the set of training data is maintained for the user and the model is associated with the user by storing model parameters of the model for the user.

11. A non-transitory computer readable storage medium embodying a computer program for performing a method, said method comprising:
entering a query by a user;
receiving a query result;
referencing the query result and a plurality of scoring functions to calculate a plurality of score vectors;
applying a model to the plurality of score vectors to generate a ranked list of score vectors;
receiving feedback on the ranked list by the user;
adding the feedback and removing past feedback from the user to develop an evolving memory, wherein the evolving memory comprises a set of training data, wherein the set of training data has a limited size;
training the model with the evolving memory;
updating the evolving memory by removing past feedback by the user from the evolving memory based on the received feedback and reaching the limited size of the set of training data; and
retraining the model based on the updated evolving memory.

12. A non-transitory computer readable storage medium as in claim 11 wherein:
the query result comprises a text corpus including a summary, a description, and metadata; and
at least one of the scoring functions considers a frequency of appearance of a word in the text corpus.

13. A non-transitory computer readable storage medium as in claim 11 wherein the feedback comprises explicit feedback.

14. A non-transitory computer readable storage medium as in claim 11 wherein the feedback comprises implicit feedback.

15. A non-transitory computer readable storage medium as in claim 11 wherein training uses a decision tree type classifier or a multi-layer perceptron.

16. A computer system comprising:
one or more processors;
a software program, executable on said computer system, the software program configured to cause an in-memory database engine of an in-memory database to:
receive a query from a user;
receive a query result;
reference the query result and a plurality of scoring functions to calculate a plurality of score vectors;
apply a model to the plurality of score vectors to generate a ranked list of score vectors;
receive feedback on the ranked list by the user;
add the feedback to develop an evolving memory stored in the in-memory database, wherein the evolving memory comprises a set of training data, wherein the set of training data has a limited size; and
train the model with the evolving memory;
update the evolving memory by removing past feedback by the user from the evolving memory based on the received feedback and reaching the limited size of the set of training data; and
retrain the model based on the updated evolving memory.

17. A computer system as in claim 16 wherein:
the query result comprises a text corpus including a summary, a description, and metadata; and
at least one of the scoring functions considers a frequency of appearance of a word in the text corpus.

18. A computer system as in claim 16 wherein the model is trained using a multi-layer perceptron or a decision tree type classifier.

19. A computer system as in claim 16 wherein the feedback comprises explicit feedback.

20. A computer system as in claim 16 wherein the feedback comprises implicit feedback.

* * * * *